April 11, 1939.  C. W. SINCLAIR  2,154,014
METHOD OF MAKING BRAKE DRUMS
Filed Sept. 30, 1935
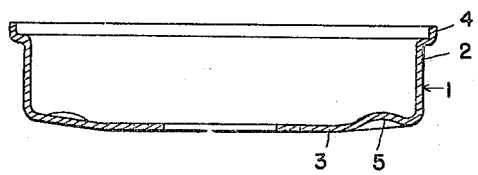
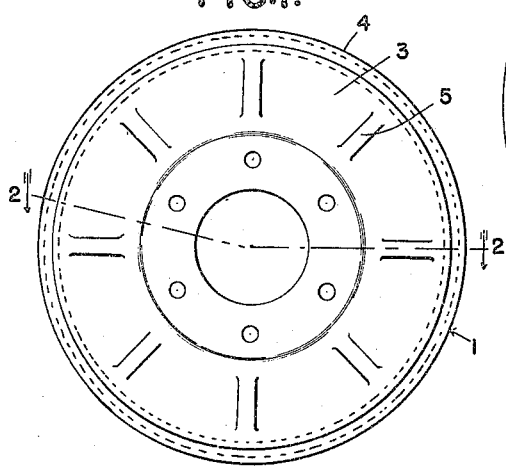
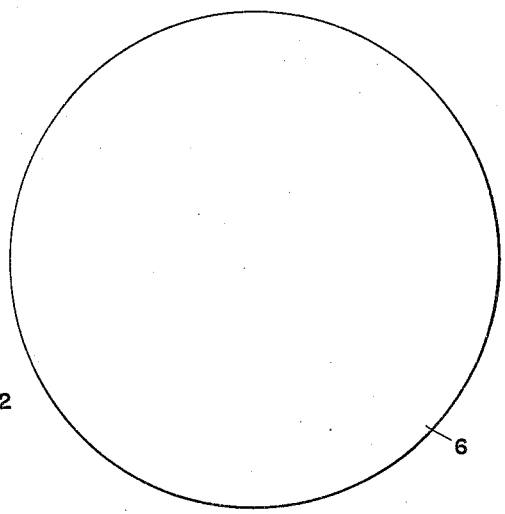
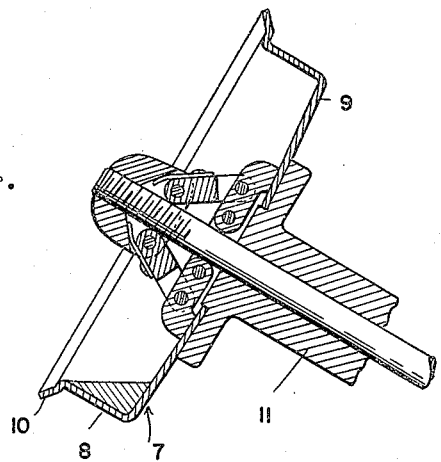
INVENTORS
CHARLES W. SINCLAIR
BY
ATTORNEYS Patented Apr. 11, 1939

2,154,014

UNITED STATES PATENT OFFICE 2,154,014

METHOD OF MAKING BRAKE DRUMS

Charles W. Sinclair, Detroit, Mich., assignor to Kelsey-Hayes Wheel Company, Detroit, Mich., a corporation of Delaware Application September 30, 1935, Serial No. 42,958

7 Claims. (Cl. 29—152.2)

The invention relates to brake drums and has for one of its objects to provide an improved brake drum having a braking surface which is satisfactory from the wear and efficiency viewpoints. The invention has for another object to provide an improved and economical method of making brake drums of this type. These and other objects of the invention will become apparent from the following description, taken in connection with the accompanying drawing, in which Figure 1 is an elevation of a brake drum embodying my invention;

Figure 2 is a cross section on the line 2—2 of Figure 1;

Figure 3 is a plan view of the blank from which the brake drum is made;

Figure 4 is a sectional view illustrating a step in the method.

As illustrated in Figures 1 and 2, the brake drum is in the nature of the shell 1 having the annular brake flange 2 and the generally radial portion or back 3 extending inwardly from one edge of the brake flange. The brake flange is provided with the annular reinforcing flange 4 and the back is formed with suitable radially extending offsets or embossments 5 to reinforce the same. The shell is preferably formed from law carbon steel and the internal face of its brake flange is case hardened to provide an efficient braking surface having satisfactory wear properties.

In the manufacture of the brake drum, I start with the flat circular sheet metal blank 6, which is shown in Figure 3 and which is preferably formed of low carbon steel. This blank is operated upon preferably in cold state by suitable dies which draw the blank into the partly formed brake drum shell 7, illustrated in Figure 4. This shell has the annular flange 8, the generally radial portion or back 9 extending inwardly from one edge of the annular flange and the annular reinforcing flange 10 extending outwardly from the other edge of the annular flange. However, the back and reinforcing flange are not completely formed, as will be noted from a comparison of Figure 4 with Figure 2.

After the formation of the partly formed brake drum shell 7, it is mounted upon the fixture 11, which is located in a furnace. This fixture mounts the shell with its axis inclined upwardly from its back 9 toward its open end or the reinforcing flange 10 the arrangement being such that the free edge of the bottom part of the brake flange 8 is elevated above the edge connected to the back 9 so that the bottom parts of the annular flange and back cooperate to form a trough. The partly formed brake drum shell on the fixture is heated in the furnace until the temperature reaches a suitable temperature, such as a range of from 1100 degrees F. to 1400 degrees F. During this heating the brake drum shell is being revolved by the fixture and when the desired temperature has been reached cyanide material, either hot or in powder form, is placed upon the internal surface of the annular flange and more particularly in the trough formed by the bottom parts of the annular flange and back by suitable means, such as a ladle, and the revolution of the brake drum shell is continued, thereby distributing the cyanide over the entire inner face or the entire braking surface. Revolving of the brake drum shell is continued the desired time to secure the required case and then the brake drum shell is removed from the fixture and quenched in a liquid, preferably water.

After the quenching, the brake drum shell is operated upon by suitable dies which cooperate to round the annular flange 8 into the final form of the brake flange 2, thereby eliminating any distortion previously caused by heating. The dies also cooperate to finish form the back 9 and the reinforcing flange 10 into the final forms of the back 3 and the reinforcing flange 4, respectively. These dies operate upon the brake drum shell while cold and the cold working sets and holds the metal of the brake drum shell in the desired condition having the form shown in Figures 1 and 2.

What I claim as my invention is:

1. The method of making a brake drum, comprising forming a brake drum shell having an annular brake flange, heating the shell, revolving the shell about a generally inclined axis, subjecting the internal face of the brake flange to a cyanide material while the shell is heated and revolving, and then quenching the shell.

2. The method of making a brake drum, comprising forming a brake drum shell having an annular brake flange, heating the shell, revolving the shell about a generally inclined axis, subjecting the internal face of the brake flange to a cyanide material while the shell is heated and revolving, quenching the shell, and subsequently refashioning the shell while cold.

3. The method of making a brake drum, comprising forming a brake drum shell having an annular brake flange and a generally radial portion extending inwardly from an edge of said flange, heating the flange, revolubly mounting the shell with the bottom part of the brake flange inclined upwardly from the bottom part of the generally radial portion, revolving the shell while thus mounted, placing cyanide material upon the bottom part of the internal face of the brake flange while the shell is heated and revolving, and then quenching the shell.

4. The method of making a brake drum, comprising forming a brake drum shell having an annular brake flange and a back from a flat sheet metal blank by drawing, heating the shell, revolving the shell with its axis inclined upwardly from its back toward its open end, placing cyanide material upon the bottom part of the internal face of the brake flange while the shell is heated and revolving, and quenching the shell.

5. The method of making a brake drum, comprising forming a brake drum shell having an annular brake flange and a back from a flat sheet metal blank by drawing, heating the shell, revolving the shell with its axis inclined upwardly from its back toward its open end, placing cyanide material upon the bottom part of the internal face of the brake flange while the shell is heated and revolving, quenching the shell, and subsequently refashioning the brake flange and back while cold.

6. The method of making a brake drum, comprising forming a brake drum shell having an annular flange, heating the shell, revolving the shell about a generally inclined axis, introducing a carburizing material into the shell while the latter is heated and revolving, quenching the shell, and fashioning said shell after the same has cooled.

7. Those steps in the method of making a brake drum which consist in forming a brake drum shell having an annular flange, heating the shell, revolving the shell about a generally inclined axis, introducing a carburizing material into the shell while the latter is rotated about said axis, cooling the shell, and refashioning the shell after the cooling operation.

CHARLES W. SINCLAIR.